(12) United States Patent
Tapanes et al.

(10) Patent No.: US 6,621,947 B1
(45) Date of Patent: Sep. 16, 2003

(54) APPARATUS AND METHOD FOR MONITORING A STRUCTURE USING A COUNTER-PROPAGATING SIGNAL METHOD FOR LOCATING EVENTS

(75) Inventors: Edward E Tapanes, Glen Waverley (AU); Jason R Goode, Rowville (AU); Jim Katsifolis, Northcote (AU)

(73) Assignee: Future Fibre Technologies Pty Ltd (AU)

( * ) Notice: Subject to any disclaimer, the term of this patent is extended or adjusted under 35 U.S.C. 154(b) by 0 days.

(21) Appl. No.: 09/857,340

(22) PCT Filed: Nov. 19, 1999

(86) PCT No.: PCT/AU99/01028

§ 371 (c)(1),
(2), (4) Date: Jun. 4, 2001

(87) PCT Pub. No.: WO00/37925

PCT Pub. Date: Jun. 29, 2000

(30) Foreign Application Priority Data

Dec. 18, 1998 (AU) .............................................. PP7808
May 3, 1999 (AU) .............................................. PQ126

(51) Int. Cl.[7] ............................. G02B 6/00; G02B 9/02; G01J 1/42
(52) U.S. Cl. ................... 385/12; 356/483; 250/227.14; 250/550
(58) Field of Search ..................... 385/12–13; 250/550, 250/227.14–227.16; 356/32, 34, 460, 477, 482, 498, 483, 450

(56) References Cited

U.S. PATENT DOCUMENTS

| 5,026,141 A | | 6/1991 | Griffiths |
| 5,311,592 A | * | 5/1994 | Udd .......................... 380/256 |
| 5,355,208 A | | 10/1994 | Crawford et al. |
| 5,356,220 A | | 10/1994 | Iida et al. |
| 5,363,463 A | | 11/1994 | Kleinerman |
| 5,455,689 A | | 10/1995 | Taylor et al. |
| 5,455,698 A | | 10/1995 | Udd |
| 5,627,637 A | | 5/1997 | Kapteyn |
| 5,636,021 A | * | 6/1997 | Udd .......................... 356/483 |
| 5,778,114 A | | 7/1998 | Eslambolchi et al. |

FOREIGN PATENT DOCUMENTS

| JP | 56-150323 | 11/1981 |
| JP | 60-14137 A | 1/1985 |
| JP | 60-169775 | 9/1985 |
| JP | 05-297052 | 11/1993 |
| JP | 10-148654 | 6/1998 |
| JP | 10-281923 | 10/1998 |

\* cited by examiner

Primary Examiner—Robert H. Kim
Assistant Examiner—Krystyna Suchecki
(74) Attorney, Agent, or Firm—Michael Best & Friedrich LLP

(57) ABSTRACT

A method and apparatus for monitoring a structure and for locating the position of an event including a light source, a waveguide, and a detector means. The waveguide receives light from the light source so that the light is caused to propagate in counter-propagating optical signals in the waveguide. The waveguide includes the counter-propagating optical signals or some characteristic of the signals modified or effected by an external parameter caused by or indicative of the event to provide modified counter-propagating optical signals. The detector means detects the modified counter-propagating optical signals effected by the parameter and determines the time delay or difference between the modified counter-propagating optical signals in order to determine the location of the event.

21 Claims, 5 Drawing Sheets

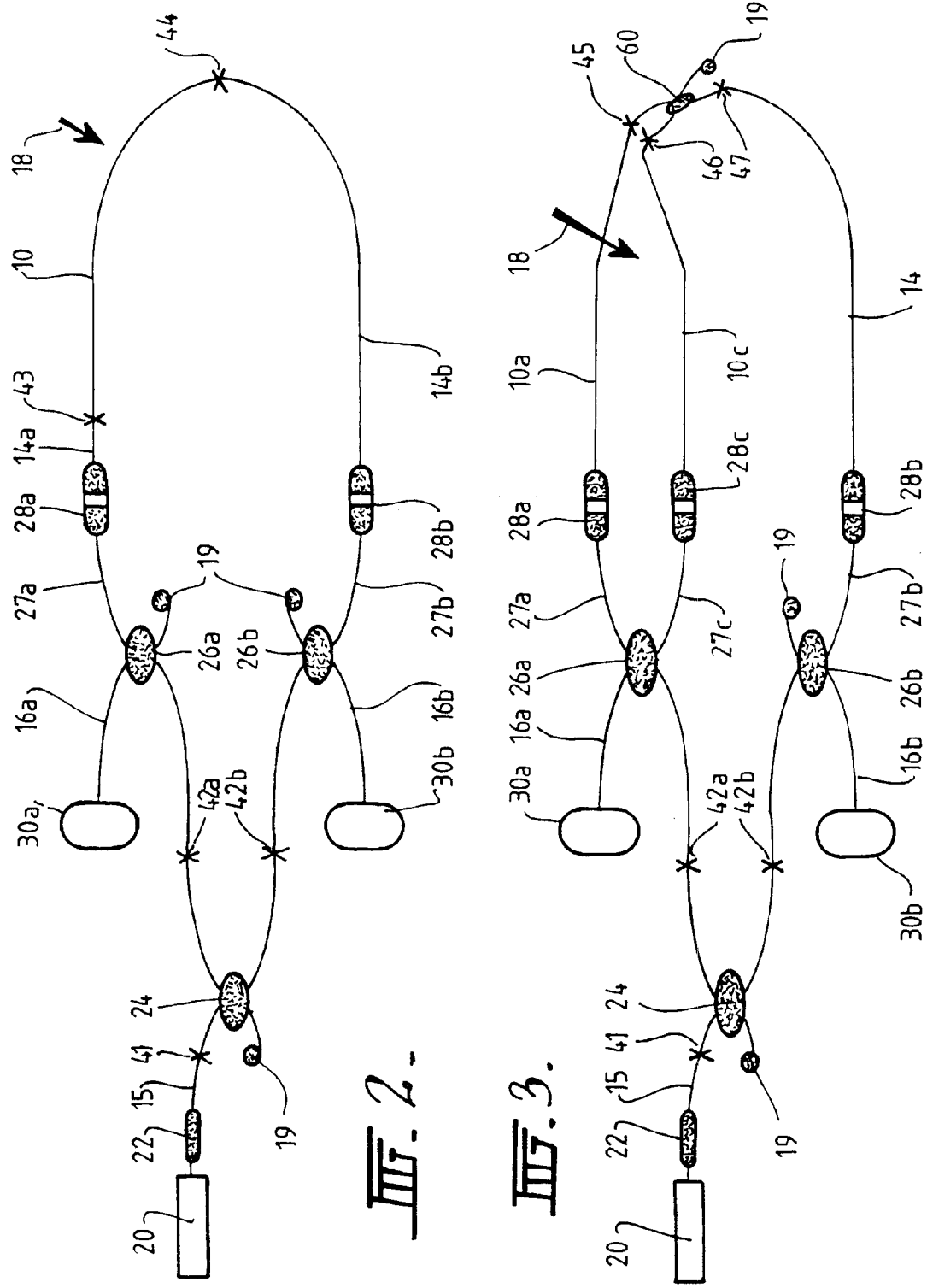

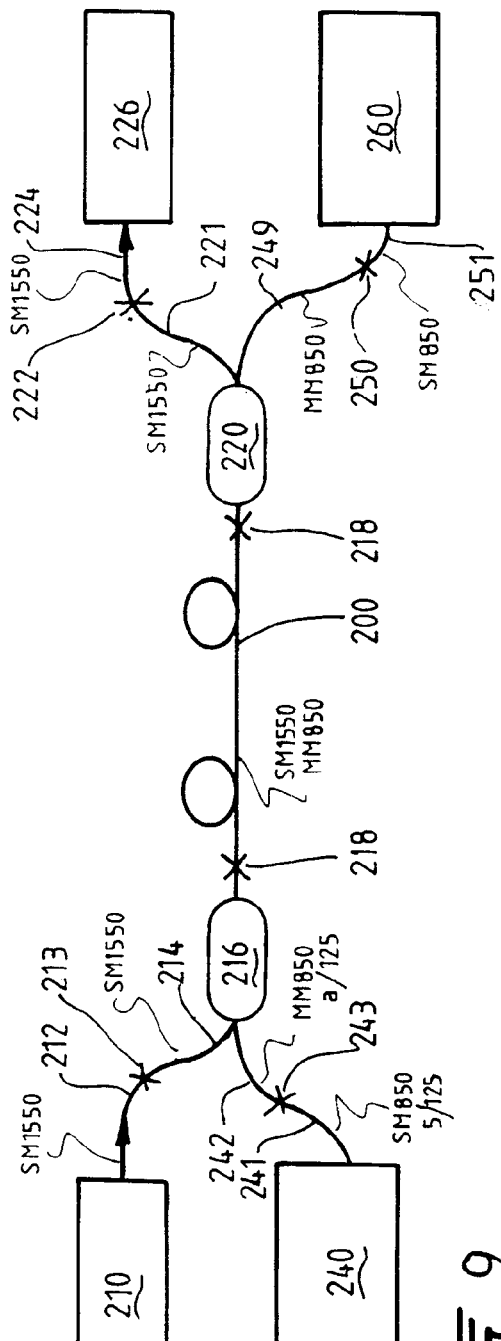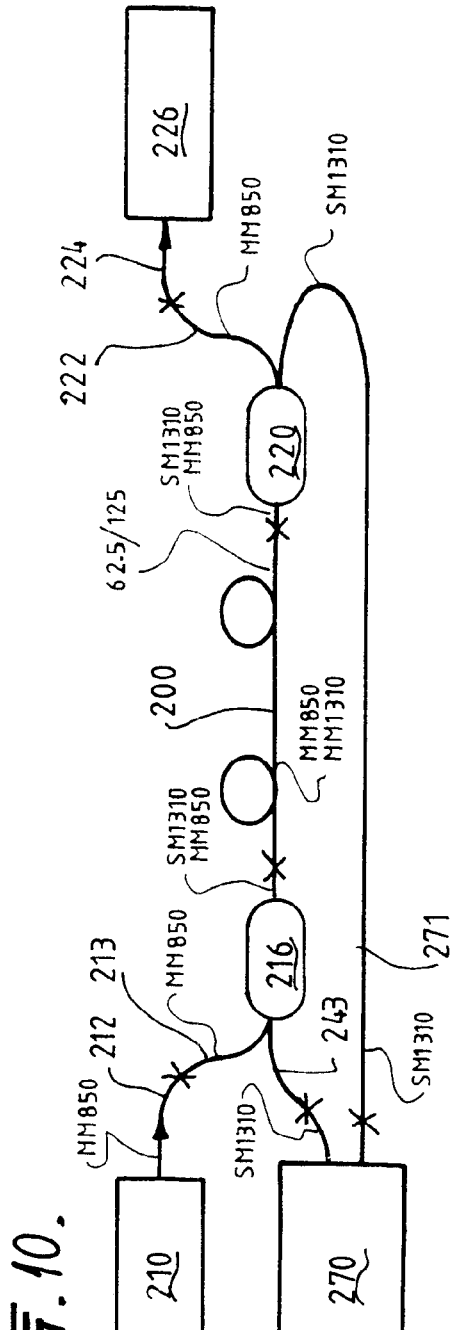
FIG. 9.
FIG. 10.

APPARATUS AND METHOD FOR MONITORING A STRUCTURE USING A COUNTER-PROPAGATING SIGNAL METHOD FOR LOCATING EVENTS

FIELD OF THE INVENTION

This invention relates to an apparatus and method for monitoring a structure which employs a waveguide transmissive counter-propagating signal method and associated systems for locating events in fibre optic sensing systems.

The term "structure" used in this specification and in the claims should be understood to mean machines, buildings, infrastructure such as pipe lines and the like to which the apparatus and method may be applied as well as waveguides themselves which act as a communication link for transmission of data from one place to another.

It should also be understood that the term "light" used in the specification and claims means both visible and non-visible parts of the electromagnetic radiation spectrum.

ART BACKGROUND

Optical devices are commonly used in industry and science and include laser cavities, waveguides, lenses, filters and other optical elements and their combinations. Such optical devices are used in a variety of instruments and installations.

Photonics technology has revolutionised the communications and sensor fields. This is mainly due to the rapid development of optical and opto-electronic devices. A wide variety of glass materials, material-dopants and waveguide structures are available and this invention relates to a waveguide transmissive counter-propagating signal method and associated systems for locating events in fibre optic sensing systems.

Presently, there is a very high demand for sensors and systems that provide real-time monitoring of the integrity or condition of structures such as machines, buildings and fibre optic communication links. Fibre optic sensors, in particular, are very promising for these applications because of their dielectric properties, their fine size, their ability to be remotely located and, in the case of intrinsic sensors, rapid response times. They also have particular advantages in hazardous environments. In addition, they have several clear advantages over existing conventional sensing techniques such as bulk optical measurements, potentiometric electrodes, resistive foil gauges and piezo-electric transducers.

Engineered structures are usually not monitored in real-time because of the difficulties in incorporating conventional sensors into the sensing environment and because of the limitations of the sensors. Furthermore, conventional sensors are generally point sensing devices, thus requiring a large number of sensors to cover a large area or long length of interest. The subsequent cost and complexity of such a system is most often impractical.

Fibre optic sensors overcome many of these difficulties by virtue of their inherent properties. In addition, optical sensors and optical processing systems are extremely fast and do not suffer from electromagnetic interference (EMI), unlike their electronic counter-parts. The technology is gaining wide acceptance for monitoring applications and is expected to play a major role in the realisation of real-time structural integrity and machine condition monitoring systems, offering an advanced new generation of engineering sensors.

Fibre optic sensor technology has progressed at a rapid pace over the last decade. Many different sensing techniques have been developed to monitor specific parameters. Different configurations of fibre sensing devices have been developed for monitoring specific parameters, each differing by the principle of light modulation. Fibre optic sensors may be intrinsic or extrinsic, depending on whether the fibre is the sensing element or the information carrier, respectively. They are designated "point" sensors when the sensing gauge length is localised to discrete regions. If the sensor is capable of sensing a measurand field continuously over its entire length, it is known as a "distributed" sensor; "quasi-distributed" sensors utilise point sensors at various locations along the fibre length. Fibre optic sensors can be transmissive or can be used in a reflective configuration by mirroring the fibre end-face. So, fibre optic sensors are actually a class of sensing device. They are not limited to a single configuration and operation unlike many conventional sensors such as electrical strain gauges and piezoelectric transducers.

However, to-date most fibre optic sensor systems are based on point sensing devices, thus again requiring a large number of sensors to cover a large area or long length.

Very few distributed techniques have been developed and are commercially available. Of those that have been developed, fewer still have the capability to actually locate the region or position of the sensed parameter or disturbance along the fibre length; they simply detect, alert and sometimes quantify that an event has occurred.

Methods devised in the prior art for distributed sensing that are capable of locating the position of the sensed parameter include:

Most current techniques for monitoring fibre optic cable integrity are based on static or slowly varying measurements employing optical time domain reflectometry (OTDR) (ie., sharp bends, fibre fracture, fibre attenuation, connector losses, etc.). This method is essentially based on an optical radar technique, where a very narrow pulse of light launched into an optical fibre is back-scattered or back-reflected by anomalies in the fibre material or structure along its length (ie., fracture, localised compression, fault, etc.) and the measured time-of-flight determines the locations of the anomalies.

Fibre Optic Distributed Temperature Sensor (DTS) systems have been developed for continuous temperature measurements along the entire length of an optical fibre, and any surface or structure which the fibre is attached to. In the majority of distributed temperature sensing, the ratio of the intensity of the Stokes and anti-Stokes return signals are measured in an optical time domain reflectometry (OTDR) configuration. The end result is a true measurement of the temperature profile along the entire length of the sensor.

Various OTDR back-scattering techniques for strain and pressure measurements have also been investigated, although no commercial technology is yet available.

Physical placement of Sagnac interferometer loops at specific locations or geometric configurations have also been used for distributed fibre disturbance detection and location. In a Sagnac interferometer, light is launched into opposite ends of a sensing fibre loop such that two beams circulate through the loop in opposite directions and then recombine to produce a phase interference pattern on a single photodetector. No use of the time of travel or time delay between the counter-propagating signals is used in these methods.

The most common methods for locating events are based on techniques using the back-scattering or back-reflection of extremely narrow pulses of laser light, combined with some other form of sensing mechanism to extract further information about the actual sensed parameter (ie., temperature, strain, pressure, etc.). However, while modern advances in photonics devices have allowed very precise and accurate systems to be developed and commercialised, they are often very complex and expensive. The main reasons for the complexity and high cost of these units is largely in the requirement for very high accuracy and high speed components needed in order to generate extremely narrow pulses of laser light, detect optical signals of extremely low power (often this involves photon-counting and significant averaging of the signals), and provide extremely accurate timing for the time-of-flight measurements of the light pulses.

Owing to the requirement of measuring and averaging the time-of-flight of very narrow, low power pulses, these techniques are often limited to monitoring static or very slowly varying parameters. In addition, to-date most systems based on this principle monitor only temperature. However, they may offer one significant advantage over most other techniques, including that of the present application; namely, the ability to provide the profile of the sensed parameter along the entire length of the fibre.

Nevertheless, it would be a significant advance to be able to also obtain real-time, quasi-static and dynamic information about any form of disturbance to the optical fibre, particularly transient events which are too quickly occurring to detect with OTDR techniques. This can be achieved by combining a distributed sensing technique incapable of locating the events with a compatible technique which is capable of locating the events. This would have the further advantage of monitoring any structure or material near the fibre or to which the fibre is attached. Such a capability should enable truly distributed sensing applications such as structural integrity monitoring, pipeline leak detection, ground monitoring, machine condition monitoring and intrusion detection of high security areas.

BRIEF SUMMARY OF THE INVENTION

The object of the present invention is to provide a waveguide transmissive counter-propagating signal method and associated systems for locating events in waveguide sensing systems.

The present invention provides an apparatus for monitoring a structure and for locating the position of an event including;

a light source;

a waveguide for receiving light from the light source so that the light is caused to propagate in both directions along the waveguide to thereby provide counter-propagating optical signals in the waveguide, the waveguide being capable of having the counter-propagating optical signals or some characteristic of the signals modified or effected by an external parameter caused by or indicative of the event to provide modified counter-propagating optical signals; and detector means for detecting the modified counter-propagating optical signals effected by the parameter and for determining the time delay or difference between the modified counter-propagating optical signals in order to determine the location of the event.

The present invention relies on the measurement of the time delay or difference between transmissive counter-propagating optical signals affected by the same event. In this novel arrangement, optical signals, preferably continuous-wave (CW) optical signals, are launched, preferably from a single light source, into the waveguide and simultaneously detected by a detector such as two separate photodetectors. Pulsing of the optical signal is not necessary, although it may be employed in some arrangements. Any sensed parameter which acts to alter the counter-propagating signals will effect both signals in the same manner, but because the effected counter-propagating signals must each continue travelling the remainder of the waveguide length to their respective photodetectors there is a resultant time delay or time difference between the detected signals. The time delay is directly proportional to the location of the sensed event along the waveguide length. Therefore, if the time delay or difference is detected and measured, the location of the event can be determined. At the same time, if a compatible sensing mechanism is being employed the sensed event can be quantified and/or identified (ie., strain, vibration, acoustic emission, temperature transient, etc.). In addition, non-sensitive fibre optic delay lines may be connected to the waveguide at either or both ends in order to add additional delay between the transmissive counter-propagating signals and to provide insensitive lead fibres. This may assist engineering the technique into a practical working system.

The invention also has the advantage of operating on virtually any existing type of transmissive distributed fibre optic sensor, enabling dynamic and transient events to be detected, quantified and located anywhere along the length of the optical fibre which forms the waveguide. Furthermore, it operates in a transmissive configuration, thus, delivering substantially the entire optical signal and power back to the detector and not requiring signal averaging, and it determines the location of events via the time delay measurement between counter-propagating optical signals effected by the same disturbance.

Examples of non-locating distributed fibre optic sensing techniques which the present invention could be compatible with, without imposing any limitations, include:

Modalmetric interferometers

Sagnac interferometers

Michelson interferometers

Long-length Fabry-Perot interferometers

Mach-Zehnder interferometers

Two-mode interferometers

Preferably the waveguide is a silica waveguide.

Preferably the light from the light source is launched simultaneously into opposite ends of the waveguide.

Preferably the light source is a single light source. However, in other embodiments two CW or synchronised light sources could be used for launching light simultaneously into opposite ends of the waveguide.

Preferably the waveguide is one or more optical fibres which forms an event sensitive optical fibre.

Preferably further silica waveguides are connected to the sensing waveguide at either or both ends in order to add additional delay between the transmissive counter-propagating signals and to provide insensitive lead waveguides.

Preferably the detector means comprises:

first and second photodetectors for simultaneously receiving the radiation from the counter-propagating signals in the silica waveguide; and processing means for receiving signals from the first and second photodetectors for determining the time delay or difference between the signals effected from the same disturbance and therefore determining the location of the sensed event.

Preferably a waveguide coupler or set of couplers is arranged between the light source and photodetectors and the silica waveguide so that the light can be simultaneously transmitted from the light source to both ends of the silica waveguide and the detector means also being connected to the coupler or couplers so that the counter-propagating transmissive radiation can be directed via the coupler or couplers from the silica waveguide to the detector means.

The invention also provides a method for monitoring a structure to locate the position of an event, including the steps of;

launching light into a waveguide so that the light is caused to propagate in both directions along the waveguide to thereby provide counter-propagating optical signals in the waveguide, the waveguide being capable of having the counter-propagating optical signals or some characteristic of the signals modified or effected by an external parameter caused by the event, to provide counter-propagating optical signals; and detecting the modified counter-propagating optical signals effected by the parameter and for determining the time delay or difference between the modified signals in order to determine the location of the event.

Preferably the light is launched into both ends of the waveguide to provide the counter-propagating signals.

Preferably the light is launched into both ends of the waveguide from a single light source.

The preferred embodiment provides a waveguide transmissive counter-propagating signal method and associated systems for locating events in optical waveguides, which may include:

providing an optical fibre (single or multi moded) formed from a waveguide material designed to simultaneously transmit counter-propagating optical signals;

providing a sensor configuration (single or multi moded), with any appropriate waveguide length, any suitable geometry and compatible with the waveguide transmissive counter-propagating signal method and associated systems for locating events in optical waveguides, designed to optimise the sensor sensitivity and detection capabilities;

providing a lead optical fibre (single or multi moded) formed from a waveguide material which acts as an insensitive light guide between the sensing fibre and the sensing and locating system optics and optoelectronics interface;

providing a lead optical fibre (single or multi moded) formed from a waveguide material which acts as an insensitive light guide between the sensing fibre and the excitation source;

fusion splicing, or otherwise connecting, the sensor waveguide and the lead optical fibres so that cores of the waveguides are aligned and remain fixed at the splice;

delivering the counter-propagating signals from the waveguide sensor, via the lead optical fibres, to an appropriate optical and electronic arrangement such that the time delay or difference between the signals may be measured and utilised to determine the location of the sensed event; and registering any changes in the waveguide sensor optical signals that may be utilised with a compatible sensing technique, such that the sensed parameter may be quantified and/or identified.

The preferred embodiment may also be said to reside in a method for producing a waveguide transmissive counter-propagating signal method and associated systems for locating events in optical waveguides, including, but not limited to, the steps of:

Preparing an optical fibre (single or multi moded) formed from a waveguide material designed to simultaneously transmit counter-propagating optical signals.

Preparing a sensor configuration (single or multi moded), with any appropriate waveguide length, any suitable geometry and compatible with the waveguide transmissive counter-propagating signal method and associated systems for locating events in optical waveguides, designed to optimise the sensor sensitivity and detection capabilities.

Preparing a waveguide sensor and optical fibre lead by cleaving or polishing their ends so as to establish a flat, smooth surface. After taking necessary precautions to remove any contaminants from the cleaved or polished waveguide sensor and fibre lead end-faces, the waveguide sensor and fibre lead are placed end-to-end in a fusion splicing apparatus and fused together using the appropriate or desired fusion arc times and currents. The fusion splicing procedure may be repeated a number of times if necessary. The core and overall diameters of the waveguide sensor and fibre lead are not limited and translation stages or V-grooves may be used on the fusion splicing apparatus to centrally align the cores of the waveguide sensor and fibre lead before the fusion splicing procedure. Different combinations of waveguide sensor and fibre lead may require a different or unique set of fusion splicing parameters.

Cleaving or polishing the waveguide sensor at any location after the fusion splice so as to establish a flat, smooth surface. The position of the cleave or polished surface establishes the localised length or sensing region of the sensor. After taking necessary precautions to remove any contaminants from the cleaved or polished waveguide sensor end-face, it is fusion spliced at a desired location to a second fibre lead.

Preparing or connectorising the free ends of the fibre leads in any manner which facilitates attaching, connecting, splicing or coupling the fibre leads to the appropriate combination and arrangement of light source, couplers, photodetectors and signal processing electronics which achieves the transmissive counter-propagating signal method for locating events in optical waveguides.

Preferably the manufactured sensor and/or the exposed fusion spliced region(s) may be protected by encapsulating or coating the desired region in a suitable device or material (ie., heatshrink fusion splice protector, acrylate, enamel, epoxy, polyimide, etc.).

In a preferred embodiment the sensor waveguide is a multimode fibre and the lead fibres are singlemode fibres.

In other embodiments a plurality of multimode fibres and singlemode fibres are fusion spliced in end-to-end relationship to form several sensitive and insensitive regions along the entire fibre assembly.

In other embodiments a plurality of singlemode fibres are fusion spliced to respective multimode fibres and the plurality of singlemode fibres are connected to a coupler which in turn is connected to a further singlemode fibre to form a multiplexed sensor arrangement.

In an alternate arrangement, the sensor fibre may be replaced by two or more suitably configured optical fibres (single or multi moded) and additional couplers may be utilised to connect the plurality of sensor fibres to the fibre optic leads. In this arrangement, a further number of couplers and photodetectors may be required at the instrumentation to facilitate the increased number of sensing and lead fibres.

In a preferred embodiment of the above alternate arrangement the sensing part is formed by two suitably configured singlemode fibres and the insensitive leads are singlemode fibres. The two sensing fibres are connected to a lead fibre by the use of a singlemode coupler at either or both ends.

The present invention is effective on any optical waveguiding distributed sensing technique that may be arranged in a transmissive configuration. In a preferred embodiment, but without limitation, the distributed sensing technique is based on a modalmetric technique utilising the fusion splicing of insensitive singlemode fibre to sensitive multimode fibre. In yet another preferred embodiment, but without limitation, the distributed sensing technique is based on a Mach-Zehnder or Michelson interferometer utilising two singlemode fibres as the sensitive region.

Preferably the waveguide comprises at least one optical fibre and/or at least one optical fibre device. In some embodiments of the invention the waveguide may merely comprise an optical fibre without any additional elements. However, the optical fibre can include passive or active elements along its length. Furthermore, the optical fibre can include sensing elements along its length and those sensing elements can comprise devices which will respond to a change in the desired parameter in the environment of application and influence the properties and characteristics of the electromagnetic radiation propagating in the waveguide to thereby provide an indication of the change in the parameter.

Preferably any suitable CW or pulsed single-frequency or multiple wavelength source or plurality of sources may be employed. In a preferred embodiment, without limitation, a CW or pulsed coherent laser diode is utilised to supply the optical signal. In an alternate arrangement, multiple light sources, of the same or varying wavelengths, may be used to generate the counter-propagating signals. The preferred embodiments of the present invention offer the potential to utilise all-fibre, low-cost optical devices in conjunction with laser diodes, light emitting diodes, photodetectors, couplers, isolators, circulators and filters. Any suitable light source, coupler and photodetector arrangement may be used with the sensor and locating systems. In a preferred embodiment, the required optical properties of the light source are such that light may be launched into and propagated in the singlemode waveguide. For localisation, the light propagated in a singlemode fibre must remain singlemoded during the entire period of travel in the singlemode fibre. Once the light is launched into the multimode fibre from the singlemode fibre, several modes may be excited and the multimoded fibre will be sensitive to various parameters. Once the light is launched back into the singlemode fibre from the multimode fibre, only a single mode is supported and travels to the optical components of the system. Lead-in/lead-out fibre desensitisation and sensor localisation is achieved in this manner. In practical applications, the singlemode fibre should be made sufficiently long to attenuate all cladding modes in order to improve the signal-to-noise ratio. This preferred embodiment applies for both directions of travel of the transmissive counter-propagating optical signals.

Utilisation of properties and characteristics of the electromagnetic radiation propagating in the waveguide sensor enables monitoring to take place in a non-destructive manner. Thus, the sensor is not necessarily damaged, fractured or destroyed in order to monitor and locate the desired parameter.

In the method, according to the preferred embodiment of the invention, electromagnetic radiation is launched into an optical waveguide (single or multi moded), such as an optical fibre, from a light source, such as a pigtailed laser diode, fibre laser or light emitting diode, and propagates along the optical waveguide. The optical waveguide is connected (temporarily or permanently) to one arm of an optical waveguide light splitter or coupler and when the electromagnetic radiation reaches the light splitter the electromagnetic radiation can branch out into the two output waveguide arms of the light splitter. Each of the output arms of this light splitter are fusion spliced to other couplers, thus the optical radiation from the laser source is simultaneously launched into each of the other two couplers. These two couplers form the launch and detection ports for the dual-ended, counter-propagating method described above. The optical signal is simultaneously launched to the output waveguide arms of the couplers. Only one output arm is used in each coupler, the other is fractured or otherwise terminated to avoid back-reflections. The output arms of the couplers are either connected (temporarily or permanently) directly to the waveguide sensing element or to a lead optical waveguide which is connected (temporarily or permanently) to the waveguide sensing element. Any one of the output waveguide arms of the light splitter may be used to deliver the electromagnetic radiation to the sensor waveguide via an optical waveguide lead. Likewise, a plurality of output waveguide arms may be used to deliver the electromagnetic radiation to a number of individual or multiplexed waveguide sensors. Each of the counter-propagating signals transmitted into the waveguide sensor propagates along the entire length of the waveguide until they reach the opposite ends and are launched back into the latter couplers in the opposite direction to the initial launch signals. The signals are each split in the reverse direction through the latter couplers. Part of the signals travel back towards the first coupler and laser, and the remainder of the signals travel along the unused arms of the latter couplers, which are terminated at photodetectors. The optical signals are simultaneously monitored by the two photodetectors. Appropriate electronics, signal processing schemes and algorithms process the signals from each detector and provide the location of the sensed event by determination of the time delay or difference between the signals effected by the same disturbance. The insensitive fibre optic leads may be very long to provide an additional time delay between the optical signals. This may assist engineering the technique into a practical working system.

In the method, according to an alternate preferred embodiment of the invention, the sensing section is formed by two or more suitably configured fibres (single or multi moded) and the insensitive leads are singlemode fibres. The plurality of sensing fibres are connected to the lead fibres by the use of additional singlemode couplers at either or both ends of the sensing fibres.

Preferably the instrument optical and electronic arrangements will utilise noise minimisation techniques.

Preferably, all the optical and electrical components will be located in a single instrument control box, with individual optical fibre input ports.

Electro-optic devices, acousto-optic devices, magneto-optic devices and/or integrated optical devices may also be utilised in the system.

The invention provides an apparatus for monitoring an optic fibre communication link into which data signals are launched and from which the data signals are received, and for locating the position of a disturbance to the link including;

a light source for launching light into the link so that the light is caused to propagate in both directions along the link to thereby provide counter-propagating optical signals in the link, the link being capable of having the counter-propagating optical signals or some characteristic of the signals modified or effected by the disturbance to provide modified counter-propagating optical signals; and detector means for detecting the modified counter-propagating optical signals and for determining the time delay or difference between the modified counter-propagating optical signals in order to determine the location of the disturbance.

The invention still further provides a method for monitoring an optical fibre communication link into which data signals are launched and from which the data signals are received, to locate the position of a disturbance to the link, including the steps of;

launching light into the link so that the light is caused to propagate in both directions along the link to thereby provide counter-propagating optical signals in the link, the link being capable of having the counter-propagating optical signals or some characteristic of the signals modified or effected by the disturbance to provide counter-propagating optical signals; and detecting the modified counter-propagating optical signals effected by the disturbance and for determining the time delay or difference between the modified signals in order to determine the location of the disturbance.

BRIEF DESCRIPTION OF THE DRAWINGS

Preferred embodiments of the present invention will be further illustrated, by way of example, with reference to the following drawings in which:

FIG. 2 is a view showing an embodiment of the invention, utilising a modalmetric sensing technique;

FIG. 3 is a view showing a further embodiment of the invention, utilising a Mach-Zehnder interferometric sensing technique;

FIG. 9 is a view of a further embodiment of the invention; and

FIG. 10 is a view of a still further embodiment of the invention.

DETAILED DESCRIPTION OF THE PREFERRED EMBODIMENTS

Figure 1:
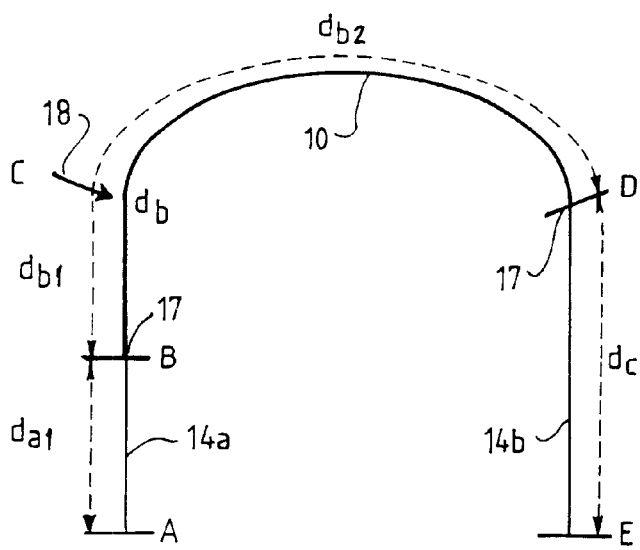
FIG. 1 is a view showing a general embodiment of the invention.

With reference to FIG. 1, a general set-up is illustrated where the distributed sensor 10 may be preceded and succeeded by certain arbitrary lengths of insensitive fibre leads 14a and 14b. It is important to emphasise that neither one or both of the insensitive fibre leads 14a and 14b are required for the methodology; they simply provide additional optical delay lines in order to add additional delay between the transmissive counter-propagating signals, to provide insensitive lead fibres and/or to facilitate specific placement of the sensing region(s). This may assist engineering the technique into a practical working system. The insensitive leads 14a and 14b may be fusion spliced 17, or otherwise connected, to the sensing fibre 10.

The optical fibre link (total distance $d_x$) is made up of an insensitive section 14a, of length $d_a$, fusion spliced 17 to a sensitive section 10, of length $d_b$, and finally fusion spliced 17 again to a third insensitive section 14b, of length $d_c$. The aim of the set-up is to locate a disturbance 18 (at point C) along the sensitive section of the fibre link 10 (between points B and D). By injecting laser light into both points A and E simultaneously, the fibre link has two counter-propagating light beams. A perturbation 18 anywhere along the sensitive part of the fibre link 10 will cause two identical perturbation signals each to propagate in alternate directions; that is, from point C towards point E, and from point C towards point A. If the difference in time of arrival of each signal (respectively at points A and E) is known, then the point along $d_b$ at which the disturbance occurred can be calculated using the following equations:

$$d_x = d_a + d_b + d_c \qquad (1)$$
$$= d_a + d_{b1} + d_{b2} + d_c$$

The difference in time of arrival of each signal (respectively at points $\Delta t$ and E), at, is given by:

$$\Delta t = (\Delta t_{b2} + \Delta t_c) - (\Delta t_{b1} + \Delta t_a) \qquad (2)$$

where $\Delta t_a$, $\Delta t_{b1}$, $\Delta t_{b2}$, $\Delta t_c$, refer to the time taken for an optical signal to travel along $d_a$, $d_{b1}$, $d_{b2}$, and $d_c$, respectively, and can be calculated for known distances using $t=d/v$, where $v$ is the speed of the optical signal given by $c/n_{fibre}$, where c is the speed of light in a vacuum ($3 \times 10^8$ m/s) and $n_{fibre}$ is the effective refractive index of the optical fibre.

Rewriting the equation for $\Delta t$, we have:

$$\Delta t = \frac{d_{b2} + d_c - d_{b1} - d_a}{v} \qquad (3)$$

Using the equation for $d_x$ we can substitute $d_{b2}=d_x-d_a-d_c-d_{b1}$, giving:

$$\Delta t = \frac{d_x - d_a - d_c - d_{b1} + d_c - d_{b1} - d_a}{v} \qquad (4)$$

$$= \frac{d_x - 2d_a - 2d_{b1}}{v}$$

$$= \frac{d_x - 2(d_a + d_{b1})}{v}$$

Therefore, the point of disturbance referenced from point A is given by:

$$\text{Point of disturbance}_A = (d_a + d_{b1}) = \frac{d_x - (v\Delta t)}{2} \quad (5)$$

Similarly, the point of disturbance referenced from point E is given by:

$$\text{Point of disturbance}_E = (d_c + d_{b2}) = \frac{d_x + v\Delta t}{2} \quad (6)$$

It is interesting to note that this result illustrates that it is required to only know the length of the entire fibre link, $d_x$, and not the respective lengths of the various sensitive and insensitive fibre regions in the system. This information can be easily obtained at the design and installation stages of a project, or post-installation by the use of an OTDR. Then, once the total length is known and the time delay, $\Delta t$, is measured by the system, it is a straight forward calculation using Equations 5 or 6 to determine the location of the sensed event.

In the embodiment of FIG. 2, CW coherent laser light is launched into a singlemode optical fibre 15, from a pigtailed laser diode 20 and fibre isolator 22, and propagates along the optical fibre 15. The optical fibre 15 is fusion spliced 41 to one arm of a singlemode fibre optic coupler 24 and when the light reaches the coupler 24 the light can branch out into the two output arms of the coupler 24. Each of the output arms of this coupler 24 are fusion spliced 42a and 42b to other singlemode fibre couplers 26a and 26b, respectively, thus the light from the laser source 20 is simultaneously launched into each of the other two couplers 26a and 26b. These two couplers 26a and 26b form the launch and detection ports for the dual-ended, counter-propagating method utilising a modalmetric sensing technique. The optical signal is simultaneously launched to the output arms 27a and 27b of the couplers 26a and 26b. Only one output arm 27a and 27b from each coupler 26a and 26b, respectively, is used, all other unused arms of couplers are fractured or otherwise terminated to avoid back-reflections 19. The output arms 27a and 27b of the couplers 26a and 26b are terminated at singlemode fibre optic bulkhead connectors (through adaptors) 28a and 28b. A connectorised singlemode fibre lead 14a is connected to the through adaptor 28a, such that the light from coupler 26a is launched into the fibre link in one direction. Similarly for the counter-propagating signal, a connectorised singlemode fibre lead 14b is connected to the through adaptor 28b, such that the light from coupler 26b is launched.into the fibre link in the opposite direction. The singlemode fibre lead 14a is fusion spliced 43 to one end of the multimode sensing fibre 10 and the singlemode fibre lead 14b is fusion spliced 44 to the opposite end of the multimode sensing fibre 10, thus forming the transmissive counter-propagating sensing loop configuration required. Each of the counter-propagating signals transmitted through the fibre sensor 10 propagates along the entire length of the fibre link until they reach the opposite ends and are launched back through leads 14a and 14b and bulkhead through adaptors 28a and 28b into the couplers 26a and 26b, respectively, in the opposite direction to the initial launch signals. The signals are each split in the reverse direction through couplers 26a and 26b. Part of the signals travel back towards the first coupler 24 and laser 20, and the remainder of the signals travel along the arms 16a and 16b of the latter couplers 26a and 26b, respectively, which are terminated at photodetectors 30a and 30b. The fibre isolator 22 is used to reduce the amount of light launched back into the laser diode. The optical signals are simultaneously monitored by the two photodetectors 30a and 30b. Appropriate electronics, signal processing schemes and algorithms process the signals from each detector 30a and 30b and provide the location 18 of the sensed event by determination of the time delay or difference between the signals effected by the same disturbance. The insensitive fibre optic leads 14a and 14b may be very long to provide an additional time delay between the optical signals, if required.

In the embodiment of FIG. 3, CW coherent laser light is launched into a singlemode optical fibre 15, from a pigtailed laser diode 20 and fibre isolator 22, and propagates along the optical fibre 15. The optical fibre 15 is fusion spliced 41 to one arm of a singlemode fibre optic coupler 24 and when the light reaches the coupler 24 the light can branch out into the two output arms of the coupler 24. Each of the output arms of this coupler 24 are fusion spliced 42a and 42b to other singlemode fibre couplers 26a and 26b, respectively, thus the light from the laser source 20 is simultaneously launched into each of the other two couplers 26a and 26b. These two couplers 26a and 26b form the launch and detection ports for the dual-ended, counter-propagating method utilising a Mach-Zehnder interferometric sensing technique. The optical signal is simultaneously launched to the output arms 27a, 27c and 27b of the couplers 26a and 26b. Only one output arm 27b from coupler 26b is used, all other unused arms of couplers are fractured or otherwise terminated to avoid back-reflections 19. The output arms 27a, 27c and 27b of the couplers 26a and 26b are terminated at singlemode fibre optic bulkhead connectors (through adaptors) 28a, 28c and 28b. Connectorised singlemode sensing fibres 10a and 10c are connected to the through adaptors 28a and 28c, respectively, such that the light from coupler 26a is simultaneously launched into the fibre link in one direction. Alternately, a further coupler could be used with arms 10a and 10c to replace using arm 27c and adaptor 28c. Similarly for the counter-propagating signal, a connectorised singlemode fibre lead 14 is connected to the through adaptor 28b, such that the light from coupler 26b is launched into the fibre link in the opposite direction. The singlemode sensing fibres 10a and 10c are fusion spliced 45 and 46, respectively, to one end of a singlemode coupler 60 and the singlemode fibre lead 14 is fusion spliced 47 to one arm of the coupler 60 on the opposite side, thus forming the transmissive counter-propagating sensing loop configuration required. The unused arm of coupler 60 is fractured or otherwise terminated to avoid back-reflections 19. Each of the counter-propagating signals transmitted through the fibre arrangement propagates along the entire length of the fibre link until they reach the opposite ends and are launched back through bulkhead connectors 28a, 28c and 28b into the couplers 26a and 26b, respectively, in the opposite direction to the initial launch signals. The signals are each split in the reverse direction through couplers 26a and 26b. Part of the signals travel back towards the first coupler 24 and laser 20, and the remainder of the signals travel along the arms 16a and 16b of the latter couplers 26a and 26b, respectively, which are terminated at photodetectors 30a and 30b. The fibre isolator 22 is used to reduce the amount of light launched back into the laser diode. The optical signals are simultaneously monitored by the two photodetectors 30a and 30b. Appropriate electronics, signal processing schemes and algorithms process the signals from each detector 30a and 30b and provide the location 18 of the sensed event by determination of the time delay or difference between the signals effected by the same disturbance. The insensitive fibre optic lead 14 may be very long to provide an additional time delay between the optical signals, if required.

Figure 4:
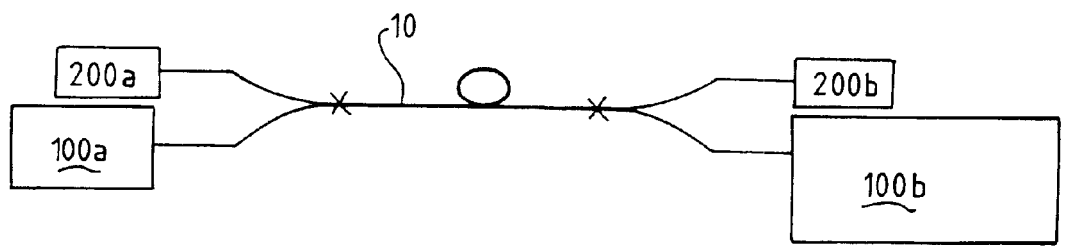
FIG. 4 shows an integrated fibre optic sensing and communication system, utilising a modalmetric sensing technique.

FIG. 4 illustrates an integrated fibre optic sensing and communication system, utilising a modalmetric sensing technique, and is described in detail in the example further below.

Figure 5:
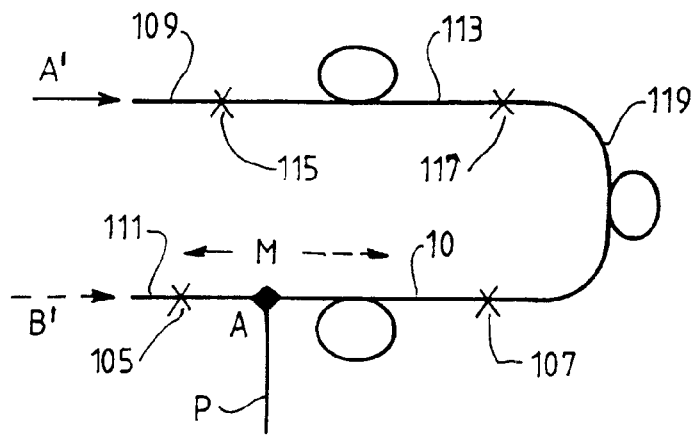
FIG. 5 is a view showing yet a further embodiment of the invention.
Figure 6:
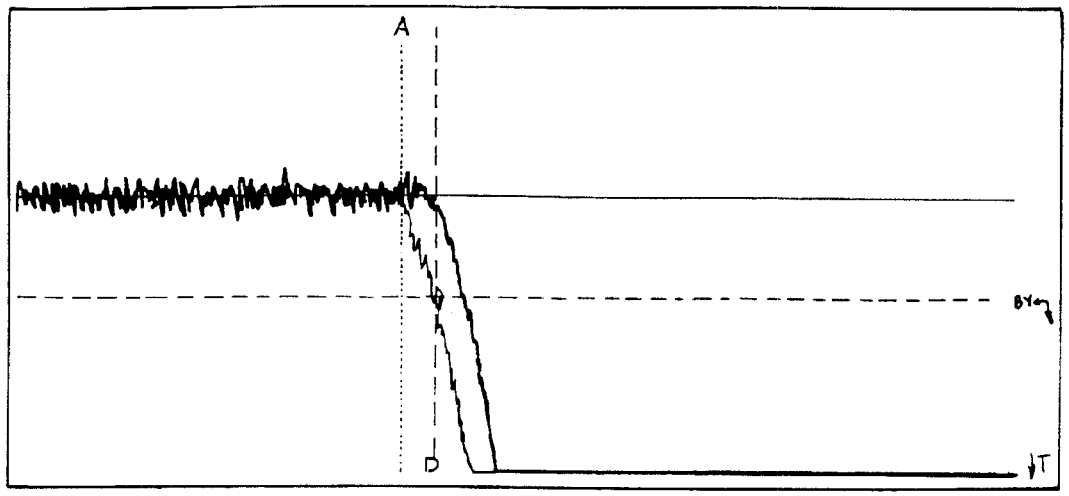
FIG. 6 is an oscilloscope plot illustrating the actual response of a system formed by the method of a preferred embodiment of the present invention, as detailed in FIG. 5, when a perturbation acts on the fibre of a 14.71 km fibre link.
Figure 7:
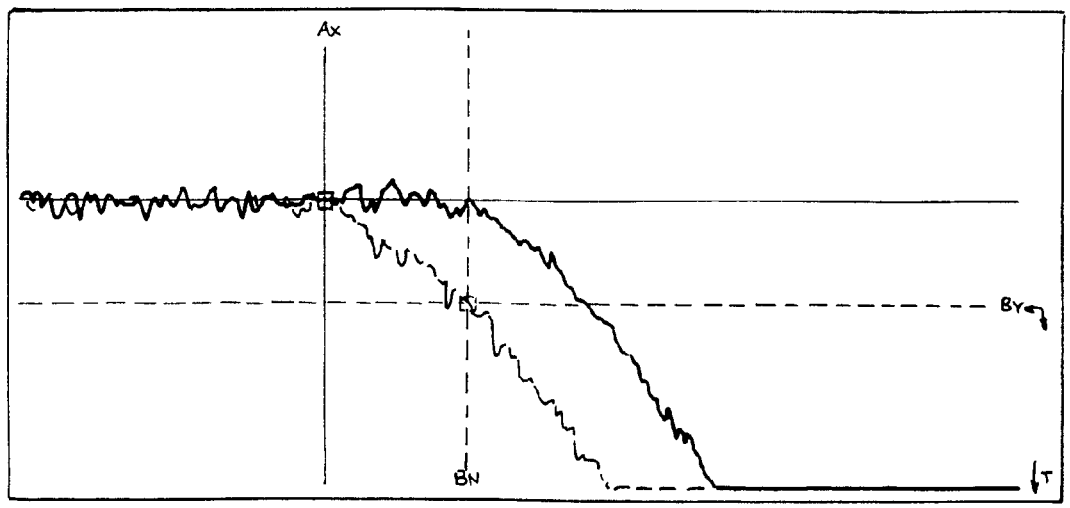
FIG. 7 is another oscilloscope plot illustrating the actual response of a system formed by the method of a preferred embodiment of the present invention, as detailed in FIG. 5, when a perturbation acts on the fibre of a 14.71 km fibre link.

FIG. 5 illustrates a view of an embodiment of the invention used to verify the feasibility of the invention, and is described in detail in the example further below. FIG. 6 illustrates an oscilloscope plot illustrating the actual response of a system formed by the method of a preferred embodiment of the present invention, as detailed in FIG. 5 and the example further below, when a perturbation acts on the fibre of a 14.71 km fibre link. FIG. 7 illustrates another oscilloscope plot illustrating the actual response of a system formed by the method of a preferred embodiment of the present invention, as detailed in FIG. 5 and the example further below, when a perturbation acts on the fibre of a 14.71 km fibre link.

Figure 8:
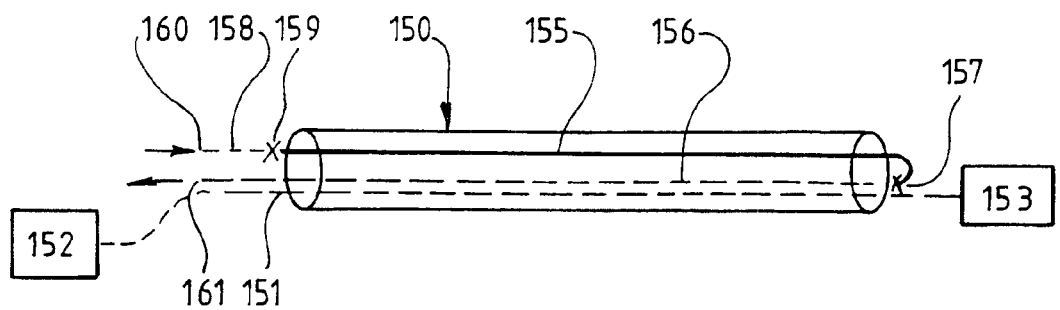
FIG. 8 shows a combined fibre optic sensing and communication arrangement, utilising a modalmetric sensing technique and the ability to locate disturbances formed by the method of the preferred embodiments of the present invention.

FIG. 8 illustrates a combined fibre optic sensing and communication arrangement, utilising a modalmetric sensing technique and the ability to locate disturbances formed by the method of the preferred embodiments of the present invention. In a practical application of this technique, it will usually be desirable for both launch points of the counter-propagating signals to be at the same physical location. This is easily achieved by using a multi-fibre cable which will effectively form a single-ended system. In this arrangement, one singlemode fibre is utilised as the communications fibre, whilst two fibres, one singlemode and one multimode, are required to set-up the modalmetric intrusion sensor (event detection and location determination) over the specified region of interest (shaded area). A perturbation anywhere along the multimode fibre in the shaded region will generate two counter-propagating perturbation signals. Measuring the time difference in their respective time of arrival at the transmitter end of the link will allow the location of the disturbance to be determined.

With reference to FIG. 8 a communication cable 150 is shown which includes a communications fibre 151. One end of the fibre 151 is connected to a transmitter 152 and the other end to a receiver 153. The transmitter 152 transmits data into the fibre 151 for receipt by the receiver 153.

The cable 150 also includes a multimode fibre 155 which is spliced to a single mode fibre 156 at splice point 157. A further single mode fibre 158 is spliced to the multimode fibre 155 at 159. The fibres 155, 156 and 158 are formed in a loop configuration within the cable 150 so that the ends 160 and 161 of the continuous fibre formed by the fibres 155, 156 and 158 are adjacent one another.

As previously explained, counter-propagating signals are launched into the two ends 160 and 161 of the fibres 155, 156 and 158 and detectors (not shown) are arranged for detecting the two counter-propagating signals which emanate from the two ends 160 and 161.

Any attempt to break into the cable 150 to physically access fibre 151 will necessarily disturb the multimode fibre 155 which is the sensing fibre and therefore the two counter-propagating perturbation signals will be produced and detected at the ends 160 and 161 in the manner previously described. By determining the time differential between the receipt of the two modified or perturbation signals the location of the attempted break-in can be determined.

Although in the preferred embodiment shown in FIG. 8 the fibres 155, 156 and 158 loop back on one another so the two ends 160 and 161 are adjacent one another, it would be possible to provide a single sensing multimode fibre which runs generally parallel with the fibre 151 and launch light into both ends of the fibre from opposite ends of the cable 150 and also detect light from both ends and synchronising the photodectors so as to obtain the time differential to locate the position of the attempted break-in.

Examples of the Preferred Embodiments

Preferred embodiments of the present invention have been tested illustrated by the following example. The optical fibre transmissive counter-propagating signal method and associated system was constructed in order to demonstrate the feasibility of producing the invention described herein. Not all of the results obtained to date are detailed in the following example.

Example

Location of Point of Disturbance Using the Modalmetric Effect

It has long been known that when a multimode optical fibre is disturbed, the distribution of the modes is affected. This modulation of the modal distribution in a multimode fibre is known as the modalmetric effect. The modalmetric effect in a multimode fibre can be used to sense and monitor vibrations, disturbances or movement of the fibre itself, or any structure or object the fibre is attached to, by detecting an intensity change in the speckle pattern output of the fibre. Modalmetric sensors can therefore be used as vibration sensors in structural monitoring, condition monitoring of high voltage equipment, intrusion detection of cables or pipelines, and in fence perimeter security.

Initially, optical fibres were deployed mainly in long-haul and high-speed telecommunication systems. However, with the decrease in cost of optical fibre cable, and optoelectronic sources and detectors, optical fibres are now being used as the main carrier in many other communications applications such as, LAN/WAN backbones, and in the private communications networks of many small and large organisations (ie., banks, defence, government, public utilities and multinationals). Many of these communications networks involve the transfer of sensitive information which has made the security of the communications link a high priority.

The modalmetric effect can easily and effectively be employed to guard against any intrusion into or tampering with an optical fibre cable. A typical set-up where the sensing is integrated into a fibre communications system is shown in FIG. 4.

Both the sensing system 100a (i.e. laser) and 100b (detector and processor) and the communication system 200a (transmitter) and 200b (receiver) are integrated into the same optical fibre 10. The wavelength of the sensing system is chosen so as not to interfere with the communications signal (via wavelength multiplexing) and also such that the fibre link is multimoded for the sensing wavelength. Several other configurations are possible, however, they all work on the same principle. The modalmetric processing unit will detect any perturbation at any point along the fibre link.

Up until now, the modalmetric sensing effect has only had the capability of sensing disturbances along a distributed multimode optical fibre sensing length, without being able to locate the exact point of the disturbance. Recent experiments by the inventors have shown that it is now possible to locate the disturbance by determining the time delay between two counter-propagating signals, according to the method of the invention described herein. The experimental work is described below for the arrangement illustrated in FIG. 5.

The set-up described in FIG. 5 is similar to that in FIG. 1, with two counter-propagating light signals $A^1$ and $B^1$ in the fibre link. Again, the sensing fibre 10 (which may be for example 2 km long and located between splicing points 105 and 107) may be a dedicated fibre in the fibre cable, or the same fibre as the communications fibre. The fibre 10 is connected to insensitive lead fibres 109 and 111 which form the ends of the waveguide network. The lead fibre 109 is connected to an insensitive fibre 113 of significant length (such as 5 km) via splice 115 and the fibre 113 is spliced at 117 to a sensitive multi-mode fibre 119 via splice 117. The fibre 119 is connected to the fibre 10 via splice 107. The fibre 119 may be of significant length such as 8.8 km. If a perturbation P is applied to the multimode fibre at the point indicated (point A), two similar or identical time varying optical signals will be generated consistent with the modalmetric effect, each travelling in the opposite direction. The perturbation signal consistent with Input 1 (PSI) will arrive at Port 2 (Output 1) before the perturbation signal consistent with Input 2 (PS2) arrives at Port 1 (Output 2). This is due to the fact that PS2 needs to propagate through for example 14.71 km (the difference in distance between A to Port 1 and A to Port 2) more optical fibre than PS1. By measuring the time delay between the two perturbation signals, the location of the disturbance can be calculated. In the above set-up, assuming a refractive index for the fibre of 1.457, then the time difference between the two signals can be calculated as:

$$\Delta t = \frac{14.71 \times 10^3 \, m}{(3 \times 10^8 \, m/s)/(1.457)} = 71.49 \, \mu s$$

Several measurements were performed on a transmissive counter-propagating fibre arrangement described in FIG. 5. An experimental set-up the same as that detailed in FIG. 2 was used to measure the perturbation signals and a Hewlett Packard 54810A Infinium digitising oscilloscope was used to sample the perturbation signals and manually measure the resultant time difference. FIGS. 6 and 7 illustrate results from two such data captures. As can be seen from both captures, there is clearly a delay between the two perturbation signals, which has been measured as 65 $\mu s$ and 70 $\mu s$ respectively, comparing well with the theoretical calculation of 71.5 $\mu s$. The error (effectively 300 m) may be a result of the assumption of the value of the effective refractive index of the fibres and by the inaccuracy in the manual measurement of the time delay. These errors could be reduced by knowing the actual effective refractive index of the fibre and by employing digital signal processing means to accurately determine the time delay.

FIGS. 9 and 10 show further embodiments of the invention in which a common waveguide is used for both transmission of data (for example a fibre communication link) and also forms the sensing fibre for determining any attempt to interfere with the fibre. These embodiments has particular application to securing communication links and indicating any attempt to break into the communication link so as to tap off data from the communication link. FIG. 10 shows a loop configuration and FIG. 9 a configuration without a loop.

In FIG. 9 an optical fibre 200 forms the communication link for transmitting data from one place to another. The fibre 200 is preferably single moded at a wavelength of 1550 nm (which will be the data transmission wavelength) and multimoded at a wavelength of 850 nm (which will be the sensing frequency). Data is launched into the fibre 200 from a transmitter 210 which may include a pigtailed laser diode with an integrated isolator so that data signals are launched into a single moded fibre 212 at the wavelength of 1550 nm. The fibre 212 is spliced at 213 to fibre 214 which is connected to one arm of a coupler 216. The output of the coupler 216 is spliced at 218 to the fibre 200. The fibre 200 is also spliced at 218 to a coupler 220. One of the arms of the coupler 220 is spliced to a single moded fibre 221 which is spliced at 222 to a further single mode fibre 224. The fibres 221 and 224 are single moded at the wavelength of 1550 nm. The fibre 224 is connected to a detector 226 which is sensitive to the wavelength of 1550 nm.

A first counter-propagating sensing system 240 is connected to the other arm of the coupler 216 by a single mode fibre 241 and a multi-mode fibre arm 242 of coupler 216 which are spliced together at splice 243. The fibres 241 and 242 are single moded and multi-moded respectfully at a wavelength of 850 nm which is the sensing wavelength used in the embodiment of FIG. 9. The counter-propagating sensing system 240 includes a transmitter such as a pigtailed laser diode for launching the light at the wavelength of 850 nm into the fibre 241, and a detector for detecting light emanating from the fibre 241 in the manner which will be described hereinafter. The system 240 can be identical to the pigtailed laser diode 20 and detector 30a described with reference to FIG. 2. The system 240 may include appropriate couplers for enabling light to be launched into the fibre 241 from the pigtailed laser diode and to enable the detector to receive light from the fibre 241. Thus, the sensing light signal is launched into the fibre 241 from the counter-propagating system 240 at a wavelength of 850 nm and is coupled with the data transmission signal from the transmitter 210 in the coupler 216. Both the data transmission signal at a wavelength of 1550 nm and the sensing signal at a wavelength of 850 nm travel through the fibre 200.

The coupler 220 has a second arm which is connected to multi-mode fibre 249 which is spliced at 250 to a further single mode fibre 251. The fibres 249 and 251 are respectively multi moded and single moded at the wavelength of 850 nm. The fibre 251 is connected to a counter-propagating sensing system 260 which is identical to the system 240. Thus, the system 260 both launches and receives sensing light signals at a wavelength of 850 nm or 670 nm into the fibres 251 and 249 for counter propagation in the fibre 200 to the signals which are launched by the system 240.

The data signal at a wavelength of 1550 nm which travels along the fibre 200 is coupled into the fibres 221 and 224 by the coupler 220 with some of the 850 nm signal. The detector 226 detects only the signal at the wavelength of 1550 nm and therefore the data which is transmitted from the transmitter 210 and is InGaAs. Retractors in systems 240 and 260 are Si type and only sensitive to the 850 nm or 670 nm wavelengths.

The counter-propagating sensing signals which are launched by the systems 240 and 260 travel in opposite directions along the fibre 200 which is multi moded at the wavelengths of 850 nm or 670 nm. Thus, the multi moded fibre 200 forms a sensitive fibre along its entire length because it is multi moded at the wavelength of 850 nm or 670 nm and therefore any attempt to break into the fibre 200 so as to tap off data from the fibre 200 will cause a change to the light signal at the wavelength of 850 nm or 670 nm launched into the fibre 200 so that modified counter-propagating signals which are modified due to the disturbance caused by the attempted break in are received by the detectors in each of the systems 240 and 260. The location of the attempted break in can be determined in the manner described in the previous embodiments by determining the time difference between the receipt of the modified signals in the system 240 and the system 260 so that the position along the length of the fibre 200 can be determined.

The detectors in the systems 240 and 260 are suitably timed synchronised with one another so that the difference in time between the receipt of the modified signal in the system 240 and receipt of the modified signal in the system 260 can be determined.

FIG. 10 shows a further embodiment which is similar to the embodiment of FIG. 9 except that rather than having two counter-propagating sensing systems 240 and 260 a single system 270 is utilised and a return loop fibre 271 is coupled to the coupler 220 so that the fibre 200 is effectivly looped back to a single system 270 in the same manner as described with reference to FIGS. 2, 3, 5 and 8. The fibre 271 is single moded at the sensing wavelength so that it is insensitive and therefore any attempt to break into the fibre 200 will cause the modification to the counter-propagating signals launched into the fibre 200 but disturbance of the fibre 271 will not cause any modification to signals in the fibre 271so that the point of attempted break in in the fibre 220 can be detected.

In this embodiment the counter-propagating signals are launched from the system 270 into the fibre 241 and also the fibre 271 for counter propagation along the fibre 200 concurrently with the data signal launched from the transmitter 210. The data signal is received by the detector 226 in the same manner as described with reference to FIG. 9. This embodiment has the advantage of locating the detectors for detecting the counter-propagating signals at the same place thereby avoiding the need for remote synchronising of detectors which are at different locations as in the embodiment of FIG. 9.

In the preferred embodiments of the invention the modified signals which are detected by the detectors are any parameter of the light signals which is altered by the disturbance to the sensing fibre. The parameter may be the intensity of the signal so that the detectors for detecting the counter-propagating signals effectively look at the intensity of the signal which is received and when the intensity changes this is indicative of the receipt of the modified signal caused by the disturbance to the sensing fibre.

Applications of the Preferred Embodiments

Optical devices and systems made by the method of the invention are useful in a wide variety of applications and fields. Not inclusive, but indicatively, the following examples illustrate some potential users of the fibre optic sensing and locating methods described herein:

Road, rail, dam and bridge maintenance firms.
Owners, operators and insurers of infrastructure.
Pipeline construction companies, contractors and operators.
Petroleum and petrochemical companies.
Offshore oil rig operators and maintenance firms.
Perimeter fence or wall security firms.
Security firms.
Government and military organisations.
Power generation and distribution industry.
Power, water and fuel facilities.
Tower owners and operators.
Aircraft manufacturers, repairers and operators.
Non-destructive evaluation firms and equipment manufacturers.
R&D companies and laboratories.
Instrument and sensor manufacturers.
Sports equipment and facilities manufacturers and operators.
Mine operators.
Owners, operators and insurers of marine vessels.
Quality Assurance and safety firms.
Building management firms.
Industrial equipment operators and manufacturers.
Nuclear power plant manufacturers, owners and operators.
Telecommunications firms or operators.
Any application requiring the detection, measurement and location of a disturbance to an optical fibre cable.

The claimed invention overcomes the disadvantages and limitations of many existing fibre optic distributed sensing techniques. Furthermore, it is capable of detecting and locating dynamic and transient events and it is less complex and lower cost than most other fibre optic distributed sensors capable of locating disturbances. Such a system would offer lower cost and increased operational and safety advantages over existing technologies and has the potential for short and long term installation monitoring in plant and ecological environments.

Since modifications within the spirit and scope of the invention may readily be effected by persons skilled within the art, it is to be understood that this invention is not limited to the particular embodiments described by way of example hereinabove.

The claims defining the invention are as follows:

1. An apparatus for monitoring a structure and for locating the position of an event including;

a light source;

a waveguide for receiving light from the light source so that the light is caused to propagate in both directions along the waveguide to thereby provide counter-propagating optical signals in the waveguide, the waveguide being capable of having the counter-propagating optical signals or some characteristic of the signals modified or effected by an external parameter caused by or indicative of the event to provide modified counter-propagating optical signals which continue to propagate along the waveguide; and detector means for detecting the modified counter-propagating optical signals effected by the parameter and for determining the time difference between the receipt of the modified counter-propagating optical signals in order to determine the location of the event.

2. The apparatus of claim 1 wherein the waveguide is a silica waveguide.

3. The apparatus of claim 1 wherein light source is for launching simultaneously into opposite ends of the waveguide.

4. The apparatus of claim 1 wherein the light source is a single light source.

5. The apparatus of claim 1 wherein the waveguide is one or more optical fibres which forms an event sensitive optical fibre.

6. The apparatus of claim 1 wherein further silica waveguides are connected to the said waveguide at either or both ends in order to add additional delay between the transmissive counter-propagating signals and to provide insensitive lead waveguides.

7. The apparatus of claim 1 wherein the detector means comprises:
  first and second photodetectors for simultaneously receiving the radiation from the counter-propagating signals in the waveguide; and
  processing means for receiving signals from the first and second photodetectors for determining the time delay or difference between the signals effected from the same disturbance and therefore determining the location of the sensed event.

8. The apparatus of claim 7 wherein a waveguide coupler or set of couplers is arranged between the light source and the photodetectors and the silica waveguide so that the light can be simultaneously transmitted from the light source to both ends of the silica waveguide and the detector means also being connected to the coupler or couplers so that the counter-propagating transmissive radiation can be directed via the coupler or couplers from the silica waveguide to the detector means.

9. The apparatus of claim 1 wherein the waveguide is for connection to the structure to monitor the structure.

10. The apparatus of claim 1 wherein the structure comprises the waveguide for transmitting data along the waveguide from one place to another and the waveguide simultaneously receiving the light from the light source to provide the counter-propagating optical signals so as to enable the integrity and security of the waveguide to be monitored.

11. The apparatus according to claim 1 wherein the detector also identifies or quantifies the parameter from the modified counter-propagating optical signals.

12. The apparatus of claim 1 wherein waveguide is arranged in a loop configuration so that light can be simultaneously launched into both ends of the waveguide from a single light source.

13. The method of claim 11 wherein data signals are supplied to the waveguide so that the waveguide acts as a communication link for transmission of data from one place to another and the launching of the counter-propagating optical signals in the waveguide enables the integrity and security of the waveguide to be monitored.

14. The apparatus according to claim 11 wherein the waveguide is applied to a structure to monitor the structure.

15. A waveguide transmissive counter-propagating signal method for locating events in optical waveguides, which may include:
  providing a sensing optical fibre formed from a waveguide material designed to simultaneously transmit counter-propagating optical signals;
  providing a detector for locating events in optical waveguides;
  providing a lead optical fibre formed from a waveguide material which acts as an insensitive light guide between the sensing fibre and detector;
  providing a lead optical fibre formed from a waveguide material which acts as an insensitive light guide between the sensing fibre and a light source;
  connecting the sensor waveguide and the lead optical fibres at a splice so that cores of the waveguides are aligned and remain fixed at the splice;
  launching counter-propagating light signals into the sensing optical fibre and lead optical fibres, which light signals are modified upon disturbance of the sensing optical fibre so that modified counter propagating optical signals continue to propagate along the sensing fibre;
  delivering the modified counter-propagating signals from the waveguide fibre, via the lead optical fibres, to the detector so the time difference between the receipt of the modified counter-propagating signals may be measured and utilised to determine the location of the sensed event; and
  registering any changes in the waveguide sensor optical signals so that the sensed parameter may be quantified and/or identified.

16. An apparatus for monitoring an optic fibre communication link into which data signals are launched and from which the data signals are received, and for locating the position of a disturbance to the link including;
  a light source for launching light into the link so that the light is caused to propagate in both directions along the link to thereby provide counter-propagating optical signals in the link, the link being capable of having the counter-propagating optical signals or some characteristic of the signals modified or effected by the disturbance to provide modified counter-propagating optical signals which continue to propagate along the link; and
  detector means for detecting the modified counter-propagating optical signals and for determining the time difference between the receipt of the modified counter-propagating optical signals in order to determine the location of the disturbance.

17. The apparatus of claim 16 wherein the link is a silica waveguide.

18. The apparatus of claim 16 wherein the light source is for launching simultaneously into opposite ends of the link.

19. The apparatus of claim 16 wherein the light source is a single light source.

20. The apparatus of claim 16 wherein the detector means comprises:
  first and second photodetectors for simultaneously receiving the light from the counter-propagating signals in the link; and
  processing means for receiving signals from the first and second photodetectors for determining the time delay or difference between the signals effected from the same disturbance and therefore determining the location of the disturbance.

21. The apparatus of claim 20 wherein a waveguide coupler or set of couplers is arranged between the light source and the photodetectors and the link so that the light can be simultaneously transmitted from the light source to both ends of the link and the detector means also being connected to the coupler or couplers so that the counter-propagating signals can be directed via the coupler or couplers from the link to the detector means.

* * * * *

(12) EX PARTE REEXAMINATION CERTIFICATE (6703rd)
United States Patent
Tapanes et al.

(10) Number: US 6,621,947 C1
(45) Certificate Issued: Mar. 17, 2009

(54) APPARATUS AND METHOD FOR MONITORING A STRUCTURE USING A COUNTER-PROPAGATING SIGNAL METHOD FOR LOCATING EVENTS

(75) Inventors: Edward E Tapanes, Glen Waverley (AU); Jason R Goode, Rowville (AU); Jim Katsifolis, Northcote (AU)

(73) Assignee: Future Fibre Technology Pty Ltd, Rowville, Victoria (AU)

Reexamination Request:
No. 90/008,199, Oct. 13, 2006

Reexamination Certificate for:
Patent No.: 6,621,947
Issued: Sep. 16, 2003
Appl. No.: 09/857,340
Filed: Jun. 4, 2001

(22) PCT Filed: Nov. 19, 1999
(86) PCT No.: PCT/AU99/01028
§ 371 (c)(1),
(2), (4) Date: Jun. 4, 2001
(87) PCT Pub. No.: WO00/37925
PCT Pub. Date: Jun. 29, 2000

(51) Int. Cl.
*G01M 5/00* (2006.01)
*G01M 11/00* (2006.01)

(52) U.S. Cl. .............. 385/12; 250/227.14; 250/550; 356/483

(58) Field of Classification Search ............ 385/12, 385/14, 50.77
See application file for complete search history.

(56) References Cited

U.S. PATENT DOCUMENTS

| 4,848,906 A | * | 7/1989 | Layton ............ 356/478 |
| 4,885,462 A |   | 12/1989 | Dakin |
| 4,915,503 A | * | 4/1990 | Pavlath ........... 356/460 |

FOREIGN PATENT DOCUMENTS

| GB | 2 204 204 A | 1/1987 |
| JP | 10160635 A | 6/1998 |

* cited by examiner

*Primary Examiner*—Anil Khatri

(57) ABSTRACT

A method and apparatus for monitoring a structure and for locating the position of an event including a light source, a waveguide, and a detector means. The waveguide receives light from the light source so that the light is caused to propagate in counter-propagating optical signals in the waveguide. The waveguide includes the counter-propagating optical signals or some characteristics of the signals modified or effected by an external parameter caused by or indicative of the event to provide modified counter-propagating optical signals. The detector means detects the modified counter-propagating optical signals effected by the parameter and determines the time delay or difference between the modified counter-propagating optical signals in order to determine the location of the event.

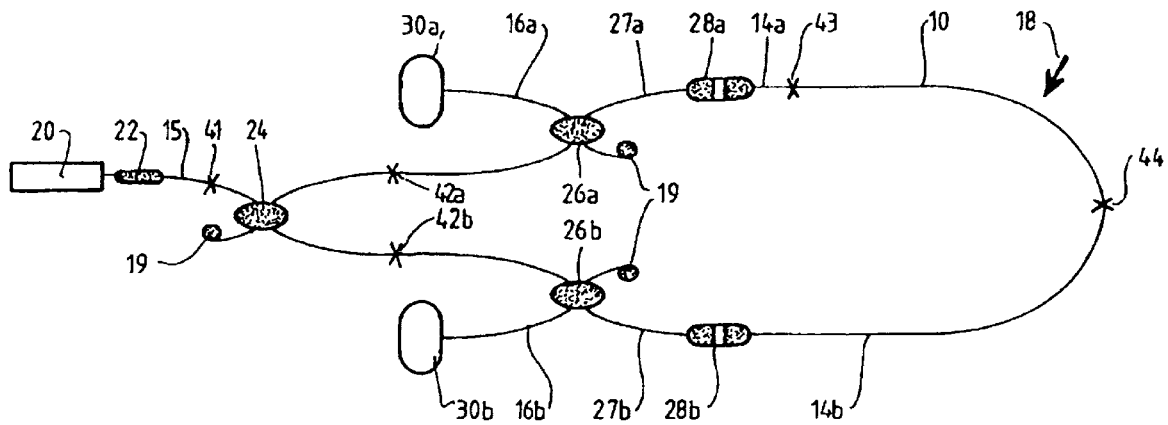

US 6,621,947 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 8 and 15 are cancelled.

Claims 1, 13 and 16 are determined to be patentable as amended.

Claims 2–7, 9–12, 14 and 17–21, dependent on an amended claim, are determined to be patentable.

New claims 22–29 are added and determined to be patentable.

1. An apparatus for monitoring a structure and for locating the position of an event comprising[:]*:*
   a light source;
   a waveguide for receiving light from the light source so that the light is caused to propagate in both directions along the waveguide to thereby provide counter-propagating optical signals in the waveguide, the waveguide being capable of having the counter-propagating optical signals or some characteristic of the signals modified or [effected] *affected* by an external parameter caused by or indicative of the event to provide modified counter-propagating optical signals which continue to propagate along the waveguide; and
   detector means *including a detector* for *separately* detecting the *respective* modified counter-propagating optical signals [effected] *affected* by the parameter and for determining the time difference between the receipt of the *separately detected respective* modified counter-propagating optical signals in order to determine the location of the event*;*
   *the waveguide comprising,*
      *a first sensitive waveguide path and a second separate sensitive waveguide path, each having a first and a second end, the first and second sensitive waveguide paths forming a Mach-Zehnder interferometer;*
      *a first coupler for receiving the light from the light source and for supplying the light to the first end of the first and second sensitive waveguide paths for propagation in a first direction through both the first and second sensitive waveguide paths;*
      *a third insensitive waveguide path for the counter-propagating optical signals, the third insensitive waveguide path having a first end and a second end; and*
      *a second coupler for coupling the second end of the first and second sensitive waveguide paths to the first end of the third insensitive waveguide path, for supplying the light propagating in the first direction through the first and second sensitive waveguide paths to the third insensitive waveguide path for propagation in* the first direction along the third insensitive waveguide path;
      *the detector also provided for receiving light propagating in the first direction from the second end of the third insensitive waveguide path;*
      *the second end of the third insensitive waveguide path provided for receiving light from the light source for propagating through the third insensitive waveguide path in a second direction opposite to the first direction;*
      *the first end of the third insensitive waveguide path provided for supplying the light propagating through the third insensitive waveguide path in the second direction to the second coupler and then to the second ends of the first and second sensitive waveguide paths for transmission through both the first and second sensitive waveguide paths in the second direction to the first coupler;*
      *the detector also provided for receiving light traveling in the second direction from the first coupler; and*
      *the light transmitted in the first and second opposite directions forming the counter-propagating optical signals.*

13. The [method] *apparatus* of claim 11 wherein data signals are supplied to the waveguide so that the waveguide acts as a communication link for transmission of data from one place to another and the launching of the counter-propagating optical signals in the waveguide enables the integrity and security of the waveguide to be monitored.

16. An apparatus for monitoring an optic fibre communication link [into which data signals are launched and from which the data signals are received,] and for locating the position of a disturbance to the link [including;]*, the apparatus comprising:*
   *an optic fibre communication link into which data signals are launched and from which the data signals are received;*
   a light source for launching light into the link so that the light is caused to propagate in both directions along the link to thereby provide counter-propagating optical signals in the link, the link being capable of having the counter-propagating optical signals or some characteristic of the signals modified or [effected] *affected* by the disturbance to provide modified counter-propagating optical signals which continue to propagate along the link; and
   detector means *including a detector* for *separately* detecting the *respective* modified counter-propagating optical signals and for determining the time difference between the receipt of the *separately detected respective* modified counter-propagating optical signals in order to determine the location of the disturbance*;*
   *the link further comprising,*
      *a first sensitive link path and a second separate sensitive link path, each having a first and a second end, the first and second sensitive link paths forming a Mach-Zehnder interferometer;*
      *a first coupler for receiving the light from the light source and for supplying the light to the first end of the first and second sensitive link paths for propagation in a first direction through both the first and second sensitive link paths;*
      *a third insensitive link path for the counter-propagating optical signals, the third insensitive link path having a first and a second end; and*
      *a second coupler for coupling the second end of the first and second sensitive link paths to the first end of the* third insensitive link path, for supplying the light propagating in the first direction through the first and second sensitive link paths to the third insensitive link path for propagation in the first direction along the third insensitive link path;

the detector also provided for receiving light propagating in the first direction from the second end of the third insensitive link path;

the second end of the third insensitive link path provided for receiving light from the light source for propagating through the third insensitive link path in a second direction opposite to the first direction;

the first end of the third insensitive link path provided for supplying the light propagating through the third insensitive link path in the second direction to the second coupler and then to the second ends of the first and second sensitive link paths for transmission through both the first and second sensitive link paths in the second direction to the first coupler;

the detector also provided for receiving light traveling in the second direction from the first coupler; and wherein the light transmitted in the first and second opposite directions forms the counter-propagating optical signals.

22. The apparatus of claim 1 wherein the detector comprises a first detector for detecting the light transmitted through the first and second waveguide paths in the first direction and a second separate detector for detecting the light transmitted through the first and second waveguide paths in the second opposite direction.

23. The apparatus of claim 22 wherein the second end of the third insensitive waveguide path is connected to a third optical coupler and wherein the light source is provided for supplying light to the third optical coupler for transmission in the second direction, the third optical coupler is also provided for supplying the light propagating in the first direction to the second detector, and the first coupler is also provided for supplying the light propagating in the second direction through the first and second waveguide paths to the first detector.

24. The apparatus of claim 1 wherein the first waveguide path, second waveguide path and third waveguide path each comprise a single optical fibre.

25. The apparatus of claim 16 wherein the detector comprises a first detector for detecting the light transmitted through the first and second link paths in the first direction and a second separate detector for detecting the light transmitted through the first and second link paths in the second opposite direction.

26. The apparatus of claim 16 wherein the second end of the third insensitive link path is connected to a third optical coupler and wherein the light source is for supplying light to the third optical coupler for transmission in the second direction, the third optical coupler is also provided for supplying the light propagating in the first direction to the second detector, and the first coupler is also provided for supplying the light propagating in the second direction through the first and second link paths to the first detector.

27. The apparatus of claim 16 wherein the first link path, second link path and third link path each comprise a single optical fibre.

28. An apparatus for monitoring a structure and for locating the position of an event comprising:

a light source;

a waveguide for receiving light from the light source so that the light is caused to propagate in both directions along the waveguide to thereby provide counter-propagating optical signals in the waveguide, the waveguide being capable of having the counter-propagating optical signals or some characteristic of signals modified or affected by an external parameter caused by or indicative of the event to provide modified counter-propagating optical signals which continue to propagate along the waveguide; and detector means including a detector for separately detecting the respective modified counter-propagating optical signals affected by the parameter and for determining the time difference between the receipt of the separately detected respective modified counter-propagating optical signals in order to determine the location of the event;

the waveguide comprising a first sensitive waveguide path and a second separate sensitive waveguide path, each having a first and a second end, the first and second sensitive waveguide paths forming a Mach-Zehnder interferometer, and the waveguide further comprising a third insensitive waveguide path for the counter-propagating optical signals, the third insensitive waveguide path having a first end and a second end.

29. An apparatus for monitoring a optical fibre communication link and for locating the position of a disturbance to the link, the apparatus comprising:

an optical fibre communication link into which data signals are launched and from which the data signals are received;

a light source for launching light into the link so that the light is caused to propagate in both directions along the link to thereby provide counter-propagating optical signals in the link, the link being capable of having the counter-propagating optical signals or some characteristic of the signals modified or affected by the disturbance to provide modified counter-propagating optical signals which continue to propagate along the link; and detector means including a detector for separately detecting the respective modified counter-propagating optical signals and for determining the time difference between the receipt of the separately detected modified counter-propagating optical signals in order to determine the location of the disturbance;

the link further comprising a first sensitive link path and a second separate sensitive link path, each having a first and a second end, the first and second sensitive link paths forming a Mach-Zehnder interferometer, and the link further comprising a third insensitive link path for the counter-propagating optical signals, the third insensitive link path having a first end and a second end.

* * * * *